US008315958B1

(12) United States Patent
Rubin et al.

(10) Patent No.: US 8,315,958 B1
(45) Date of Patent: Nov. 20, 2012

(54) COMPUTER METHOD FOR DESIGNING A SYSTEM OF SYSTEMS USING CONTEXT-FREE GRAMMARS

(75) Inventors: Stuart Rubin, San Diego, CA (US); Witold Pedrycz, Edmonton (CA)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 480 days.

(21) Appl. No.: 12/719,225

(22) Filed: Mar. 8, 2010

(51) Int. Cl.
*G06F 15/18* (2006.01)
*G06N 3/00* (2006.01)
*G06N 3/12* (2006.01)

(52) U.S. Cl. .......... 706/13

(58) Field of Classification Search .......... None
See application file for complete search history.

(56) References Cited

U.S. PATENT DOCUMENTS 4,754,410 A * 6/1988 Leech et al. .......... 706/45
7,047,226 B2 5/2006 Rubin
7,925,605 B1 * 4/2011 Rubin .......... 706/47

OTHER PUBLICATIONS

Stuart Rubin et al, "Modeling Human Cognition Using a Transformational Knowledge Architecture", Proceedings of the IEEE International Conference on System of Systems Engineering (SoSE). Monterey, CA 2008.

Witold Pedrycz et al, "Numeric Data to Information Granules and Computing With Words", IEEE 2009 International Conference on Systems, Man and Cybernetics, San Antonio, TX, Oct. 11-14, 2009.

Stuart Rubin et al, "Data Compactification and Computing With Words", Engineering Applications of Artificial Intelligence, Nov. 2009.

* cited by examiner

*Primary Examiner* — Jeffrey A Gaffin
*Assistant Examiner* — Li-Wu Chang
(74) *Attorney, Agent, or Firm* — Kyle Eppele; Stephen E. Baldwin

(57) ABSTRACT

The underlying objective of this invention is to show how fuzzy sets (and information granules in general) and grammatical inference play an interdependent role in information granularization and knowledge-based problem characterization. The bottom-up organization of the material starts with a concept and selected techniques of data compactification which involves information granulation and gives rise to higher order constructs (type-2 fuzzy sets). The detailed algorithmic investigations are provided. In the sequel, we focus on Computing with Words (CW), which in this context is treated as a general paradigm of processing information granules. We elaborate on a role of randomization and offer a detailed example illustrating the essence of the granular constructs along with the grammatical aspects of the processing.

4 Claims, 7 Drawing Sheets

50

70

80

COMPUTER METHOD FOR DESIGNING A SYSTEM OF SYSTEMS USING CONTEXT-FREE GRAMMARS

FEDERALLY-SPONSORED RESEARCH AND DEVELOPMENT

This invention (Navy Case No. 100143) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

CROSS-REFERENCE TO RELATED PATENT APPLICATIONS

This application is related to application Ser. No. 12/652,215, filed Jan. 5, 2010, entitled Type 5 Knowledge Amplification By Structured Expert Randomization (KASER), assigned to the same assignee as the present invention, and the details of which are hereby incorporated by reference.

BACKGROUND AND SUMMARY OF THE INVENTION

The old way of inventing systems of systems was for the human in the loop to breadboard or simulate the component swaps and then arrange to test the resultant design against some set of standards. The limitation here was that this took time and any knowledge gained through the laborious process was not captured for reuse. This is in stark contrast with the methodology of this invention, which exhibits a capability to learn when and where to reuse components in a transformative design. This implies that the human need only supply relatively novel knowledge and the machine will have learned when and where to apply lessons learned. In a very general sense, this may be thought of as the ultimate assembly line for design processes. This also figures into a reduction in overall costs.

BRIEF DESCRIPTION OF THE DRAWINGS

Throughout the several views, like elements are referenced using like references.

DETAILED DESCRIPTION OF EMBODIMENTS

Figure 1:
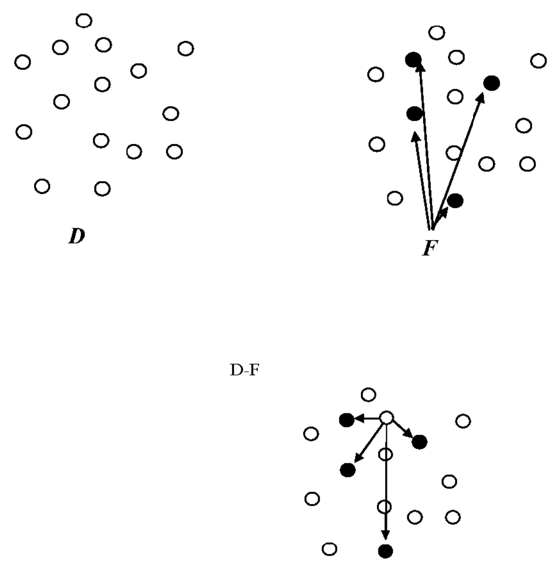
FIG. 1 shows an example of compactification of data.

The present invention provides a method for use in a computer, a method comprising the steps of:

designing a system of systems, where the systems include a first-designed system defined by passive granulated information components using context-free grammars, the method further comprising the steps of:

randomizing all components to maximize reusability and minimize the incidence of error, including increasing the density of the passive granulated information components; applying components, as appropriate, such that the image of transformation (defining symmetry) can either create a passive component (i.e., an object) or an active component (i.e., a component capable of transforming other components—including itself, in a more compact form); caching the image of transformation along with its transformative definition, including caching at least the fundamental derivation, where the active transformation components create symmetric (creative) designs; and, where all components are represented in a context-free grammar under direct human control.

The systems can include iteratively defined sub-systems, where the passive components and active components are reused in whole or in part.

The method can further include creating a version space of possible maps from the first system design to the second related system design, the version space having rules, which are automatically constrained by other cases in the first system design memory, which may not be contradicted. Here, unlike the situation for the published literature on version spaces and heuristic version spaces, direct human feedback provides for the collapse of the version space to a concept(s)—thereby insuring tractability.

The method also includes automatically porting knowledge from the first system design to the second system design such that the second system design automatically learns with use and user feedback how to generalize the first system design so as to enable the creation of the version space.

The method also includes transforming the second generalization to the design of the second system through the application of active transforms and includes adding a context-sensitive transformation rule(s) to prevent inappropriate application of the active transform(s).

The technology of this invention is intended to be used to design or invent systems of systems (e.g., a thermoelectric refrigerator from one based on the Carnot cycle). As such, the list of companies having a potential interest in the technology is virtually limitless. The future commercial potential of this invention is enormous—from the design of high-bypass jet engines to medical regimens to silent electromagnetic propulsion for submarines. This may or may not lead to viable commercial products having extended commercial life. The salient point to be made is that the suggested methodology can keep new products in the development pipeline, which macro economists know to be critical to associated economic development and near full employment. It is believed that that this invention will serve to create white and steel collar jobs alike.

The underlying objective of this invention is to show how fuzzy sets (and information granules in general) and grammatical inference play an interdependent role in information granularization and knowledge-based problem characterization. The bottom-up organization of the material starts with a concept and selected techniques of data compactification which involves information granulation and gives rise to higher order constructs (type-2 fuzzy sets). The detailed algorithmic investigations are provided. We focus on Computing with Words (CW), which in this context is treated as a general paradigm of processing information granules. We elaborate on a role of randomization and offer a detailed refrigeration example illustrating the essence of the granular constructs along with the grammatical aspects of the processing. The present invention provides a grammatical technique for knowledge transformation and reuse in the context of transforming one system of systems into another, possibly superior one.

1. Introduction and Problem Formulation

Assessing quality of available data, especially in situations where they are significantly scattered and of high dimensionality becomes crucial for their further usage in a variety of reasoning schemes. The nature of data and their distribution implies different levels of quality of results of inference.

The data usually come with some redundancy, which is detrimental to most of the processing in which they are involved. It could be also inconvenient to interpret them considering the size of the data set itself. Taking those factors into consideration, it could be of interest to represent the whole data set D by its selected subset of elements F, where $F \subset D$. While there is a wealth of approaches that exist today, most of them are concerned with some form of averaging meaning that at the end we come up with the elements, which have never existed in the original data meaning that they usually may not have any straightforward interpretation. In contrast, if F is a subset of D, the interpretability does not cause difficulties. It is also evident that the choice of the elements of F, as well as their number, implies the quality of representation of original data D. This set being treated as a "condensation" of D can be a result of a certain optimization. The cardinality of F, which is far lower that the cardinality of D helps alleviate the two problems we identified at the very beginning.

Let us start with a formal presentation of the problem, where we also introduce all required notation. We are provided with a collection of data $D=(x_k, y_k)$, $k=1, 2, \ldots, N$ forming an experimental evidence coming from a certain process or phenomenon. We assume that $x_k$ and $y_k$ are vectors in $R^n$ and $R^m$, respectively. The semantics of $x_k$ and $y_k$ depends on the setting of the problem (and will be exemplified through several examples); in general we can regard $y_k$ to be a certain indicator (output) associated with the given $x_k$.

Graphically, we can portray the crux of the problem in FIG. 1. The crux of the optimization criterion guiding the construction of F is to represent D by the elements of F to the greatest extent; we will elaborate on the details of the objective function later on. Each element of D is expressed via a certain relationship whose "c" arguments $(x_{i1}, x_{i2}, \ldots, x_{ic})$ are elements of F, see also FIG. 1. More specifically, we can describe it concisely as $$\hat{y}_k=\Phi(x_k; x_{i1}, x_{i2}, \ldots, x_{ic}) \quad (1)$$

where $k \in N\text{-}I$ and we strive for the relationship $\hat{y}_k=y_k$, which can be achieved through some optimization of the mapping itself as well as by way in which F has been constructed.

As the form of the mapping stipulates, we are concerned with a certain method for data compactification. FIG. 1 shows the compactification of data from original data D to its compact representation F, shown in a way in which elements of D-F are represented by the content of F.

In the study, we use some additional notation: let N stand for the set of indexes, $N=\{1, 2, \ldots, N\}$, while I be a subset of "c" indexes of N, $I \subset N$, $I=\{i_1, i_2, \ldots, i_c\}$ used to denote the elements of F.

The structure of the data as presented above is suitable in a variety of contexts:

- decision-making processes. For instance, in assessing terrorist threats we are provided (on the basis of some previous cases or scenarios), a collection of characterizations of a threat situation $(x_k)$ and the associated actions along with their preference (relevance) $y_k$, say $y_k=[0.8\ 0.4\ 0.05]$ with actions such as "enhance surveillance", "deploy patrol", or "issue warning".
- prediction Here $x_k$ is concerned with a vector of variables describing a certain process at a given moment in time, while $y_k$ is a vector of the same variables with the values assumed in the consecutive moment. The concept can be used in various schemes of learning—including neural networks.
- classification In this case, $x_k$ is viewed as a vector of features in the n-dimensional space, while $y_k$ is a Boolean vector of class allocation; in particular for a two-class problem, $y_k$ assumes a single Boolean value.

It is worth noting that a well-known scheme for case-based reasoning (CBR) emerges as one of the general alternatives, which takes advantage of the format of the data used here. In general, CBR embraces four major processes: (a) retrieving cases from memory that are relevant to a target problem; (b) mapping the solution from the closest (the most similar) retrieved case to the target problem; (c) possible modification of the solution (its adaptation to the target problem); and (d) retaining the solution as a new case in memory. This study shows that the successive phases of processing can be realized and the reasoning results quantified in terms of information granules.

One of the problems addressed by this paper is not only that of quantitative granularization and its attendant mechanics and algorithmic details, but that of qualitative granularization and fuzzification (or computing with words as it is more commonly known in the literature). A related problem, addressed herein, has to do with knowledge imbued in specific domains vs. techniques for general domains, which may be NP-hard. It will be shown that the computer as a device for carrying out massive (and concurrent) searches underpins both and that computing with words can be underpinned by transformational grammars. A specific example relating to the design of a refrigeration device serves to illustrate the point. While 2-level or w-grammars (i.e., a pair of CFGs, where one generates the productions used by its companion) are of Type 0 generality, the exposition shows that such grammars may transform—not merely write the productions of another grammar in a manner that is similar to the duality between data and program found in common LISP.

The paper is structured in a bottom-up manner. We start with the formulation of the optimization problem (Section 2); here we clearly identify the main phases of the process of optimization by distinguishing between parametric and structural enhancements. The structural aspect of optimization is handled by running one of the techniques of evolutionary optimization, namely Particle Swarm Optimization (PSO). The pertinent discussion is covered in Section 3. Section 4 is concerned with the development of higher-order information granules, which are inherently associated with the essence of the compactification process. We show that, on a conceptual level, the resulting constructs become interval-valued fuzzy sets or type-2 fuzzy sets, in a general setting. Illustrative experiments are reported in Section 6. While those sections are of more detailed nature, in the sequel we build upon these findings and focus on Computing with Words (CW) as a general paradigm of processing information granules. Here we underline the role of randomization as being inherent to the essence of the CW processing. A detailed design example is covered in Section 7.

2. The Optimization Process

Proceeding with the formulation of the problem, there are two essential design tasks, that is (a) determination of F, and (b) formation of the prediction (estimation) mechanism of the output part associated with $x_k \in F$. We start in a bottom-up fashion considering (b) and assuming that at this phase the set F has been already determined.

2.1. Reconstruction and its Underlying Optimization

In the reconstruction procedure, our intent is to express (predict) the conclusion part associated with $x_k \in F$ in such a way that this prediction $y_k$ is made as close as possible to $y_k$. Intuitively $y_k$ can be expressed on a basis of what is available to us that is $y_i \in F$. A general view can be expressed in the form of the following aggregation $$\hat{y}_k = \sum_{i \in I} u_i(x_k) y_i \tag{2}$$

where $u_i(x_k)$ is sought as a level of activation, closeness, proximity, or relevance of $x_k \in$ D-F and the i-th element of F. The closer the two elements are, the higher the value of $u_i(x_k)$ is. In some sense, $u_i(x_k)$ can be treated as a receptive field constricted around $x_i$ capturing the influence $x_i$ has on its neighborhood. The closeness is quantified through some distance and here we may benefit from a variety of ways in which the distance could be expressed. In addition to the commonly encountered distance functions, one can also consider those based on tensor representation of the space, cf. [5]. The optimization of the receptive field comes from the following formulation of the optimization problem $$V = \sum_{i \in I} u_i^p(x_k) \|x_k - x_i\|^2 \tag{3}$$

$$\text{Min } V \text{ with respect to } x_i \in I.$$

where we assume that $u_i(x_k) \in [0,1]$ and as usual require that these values sum to 1. The extra parameter (p), p>1 helps form the shape of the receptive field by quantifying how much influence $x_i$ exerts on its neighborhood. If $p \approx 1$ the influence is the most visible; whereas, with the higher values of "p" the impact tempers off quite quickly. Consider the values of "p" around 3-4. Here, the receptive field becomes very localized by exhibiting "spikes" positioned at $x_i$—only with a very fast decline of the field.

Proceeding with the optimization of (3) we convert the optimization with constraint $$\sum_{i \in I} u_i(x_k) = 1$$

into an unconstrained optimization by making use of the Lagrange multiplier γ, where now the minimized performance indeed reads as $$V_1 = \sum_{i \in I} u_i^p(x_k) \|x_k - x_i\|^2 + \lambda\left(\sum_{i \in I} u_i(x_k) - 1\right) \tag{4}$$

By solving $$\frac{dV_1}{du_i(x_k)} = 0, \quad i \in I$$

and $$\frac{dV_1}{d\lambda} = 0,$$

we obtain $$u_i(x_k) = \frac{1}{\sum_{j \in I} \left( \frac{\|x_k - x_i\|}{\|x_k - x_j\|} \right)^{\frac{2}{(p-1)}}} \tag{5}$$

$i \in I$, $K \in N-I$. Turning on to the first problem, the minimization of (3), with the $u_i(x_k)$ computed as given by (5), depends on the choice of the representative subset of D, that is $$Q = \sum_{k \in N-I} (y_k - \hat{y}_k)^2 \tag{6}$$

$$\text{Min}_I Q$$

This is an optimization problem of combinatorial character (i.e., the 2-norm) and as such it requires a very different optimization scheme. Techniques for evolutionary optimization are of interest in this setting. In particular, we consider a concept of Particle Swarm Optimization (PSO).

3. Particle Swarm Optimization as a Vehicle of Population-oriented Optimization

A particle swarm is a population of particles—possible solutions in the multidimensional search space. A significant number of applications of the PSO have been reported in the literature. Each particle independently explores the search space and during this search it follows some quite intuitively appealing guidelines for navigating the overall search process: (a) it tries to follow its previous direction, and (b) it looks back at the best performance—both at the level of the individual particle and at that of the entire population. In this sense, the algorithm exhibits some societal facets as there is some collective search of the problem space along with some component of memory incorporated as an integral part of the search mechanism.

The performance of each particle during its movement is assessed by means of some performance index. A position of a swarm in the search space S ($\subset R^n$), is described by some vector z(iter) $\in$S, where "iter" denotes a consecutive discrete time moment (iteration). The next position of the particle is governed by the following update expressions concerning the particle, z(iter+1) and its speed, v(iter+1)

$$z(\text{iter}+1)=z(\text{iter})+v(\text{iter}+1)\text{//update of position of the particle}$$

$$v(\text{iter}+1)=\xi\, v(\text{iter})+\phi_1(p-x(\text{iter}))+\phi_2(p_{total}-x(\text{iter}))\text{// update of speed of the particle} \quad (7)$$

where p denotes the best position (the lowest performance index) reported so far for this particle, $p_{total}$ is the best position overall developed so far across the whole population. $\phi_1$ and $\phi_2$ are random numbers drawn from the uniform distribution U[0,2] defined over [0,2] that help build a proper mix of the components of the speed; different random numbers affect the individual coordinates of the speed. The second expression governing the change in the velocity of the particle is particularly interesting as it nicely captures the relationship between the particle and its history as well as the history of the overall population in terms of its performance reported so far.

The three components contributing to the modified speed of the particle; namely, the current speed v(t) scaled by the inertial weight (ξ) smaller than 1 (whose role is to quantify resistance to change in the current speed), memory of the particle (alluding to the best position achieved so far), and some societal aspect of the optimization scheme expressed by its reliance on the best performance reported across the whole population.

Figure 2:
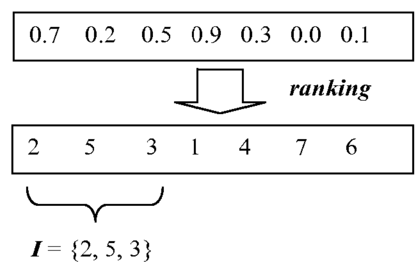
FIG. 2 shows ranking of entries of a vector z.

While the PSO scheme is of a general nature and independent from the specific optimization problem, it is critical to its effective use to represent the search space S in terms of its components. Let us note that the combinatorial nature of the minimization problem comes with the set of indexes I, which imply a subset of "c" data used to represent the remaining elements. The vector z comprises "N" entries in [0,1]. Its entries are ranked and the first "c" locations return a set of indexes of I. An illustrative example is shown below in FIG. 2, which shows an example of z, ranking of its entries producing the set of indexes I; here N={1, 2, . . . , 7, c=3.

4. Information Granules of Higher Order as Constructs of Compactification

Figure 3:
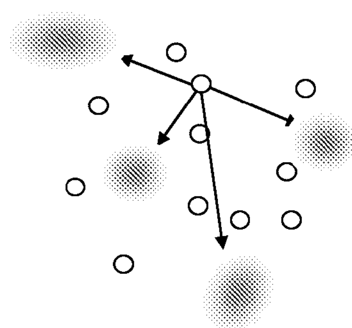
FIG. 3 shows a representation of elements as information granules.

The compactification procedure returns a collection of representatives I using which we represent all elements in K-I. In view of the far lower cardinality of F, we could anticipate that its elements may be regarded as descriptors of all elements in the far larger set D-F. We could capture this representation aspect by reflecting the representation aspect of the elements of F through constructing information granules on the basis of their original numeric representation. In greater detail, in the case of numeric vectors $x_k$, we form information granules—intervals or more generally fuzzy sets. In the case of the corresponding $y_k$'s (which could be fuzzy sets to start with), we end up with higher order fuzzy sets and type-2 fuzzy sets, in particular. The overall view of the concept is visualized in FIG. 3, which shows the representation of elements of F as information granules of higher order—intervals, fuzzy sets, or type-2 fuzzy sets.

The essential task pertains to a construction of the information granules in a manner in which we can arrive at the characteristic functions, or membership functions, of the elements of F.

Before proceeding with the detailed algorithmic developments, which realize a concept of justifiable granularity (where we consider that the granularity of information has to be legitimized by the diversity of the detailed information upon which it is constructed), we recall some organizational aspects. Each element of D-F produces a degree of membership for the i-th element in F, which is computed with the use of (4). Consider a fixed element of F, say $i_0 \in I$. The membership degrees associated with it constitute a set $\{u_{i0}(x_k)\}$ $k \in$ N-I. Next, we concentrate on the individual coordinates of $x_{i0}$ as well as $x_k$, $k \in$ N-I. Fix the coordinate: this results in pairs of the form $\{z_k, u_{i0}(x_k)\}$ $k \in$ N-I. In addition, include the corresponding coordinate of $x_{i0}$, denote it by $z_0$, for which the membership degree is equal to 1. Altogether we obtain the set of pairs $$\{z_k, u_{i0}(x_k)\}, k \in N\text{-}I, (z_0, 1)\} \quad (8)$$

The essential principle here is to quantify the variability existing in a set of available membership degrees in the form of some information granule such as an interval or another fuzzy set.

Figure 4:
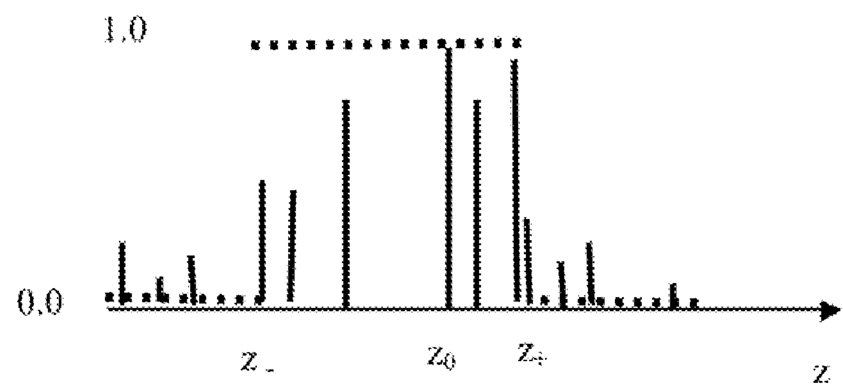
FIG. 4 shows a computation of interval representation of numeric values.

Given this set of pairs described by (8), see also FIG. 4, we are interested in representing these membership values by spanning an interval $[z_-, z_+]$ around $z_0$ so that it realizes an intuitively appealing procedure: increase high membership values to 1 and reduce to 0 low membership values. In this sense, we form an interval as a suitable information granule capturing the diversity residing within all of the pairs (8); refer again to FIG. 4.

More formally, we develop an interval around $z_0$ whose bounds are expressed as follows if $z_i \in [z_-, z_+]$ then elevate to membership grades to 1 if $z_i \notin [z_-, z_+]$ then reduce membership grades to 0

FIG. 4 shows computing the interval representation of numeric values through the principle of justifiable granularity by optimizing the effect of elevation and suppression of the corresponding membership degrees The bounds of the interval $[z_-, z_+]$ are subject to optimization with the criterion that the total changes to membership degrees (being equal either to $1-u_i(x_k)$ or $u_i(x_k)$) are made as small as possible. The changes in the values of $z_-$ and $z_+$ are made in such a way that we minimize the following performance index.

$$\text{Min}_{z_1,z_2 \in R: z_1 \le z_2}\left\{\sum_{a_i \in [z_1,z_2]} (1-u_i(x_k)) + \sum_{a_1 \notin [z_1,z_2]} u_i(x_k)\right\} \quad (9)$$

Figure 5:
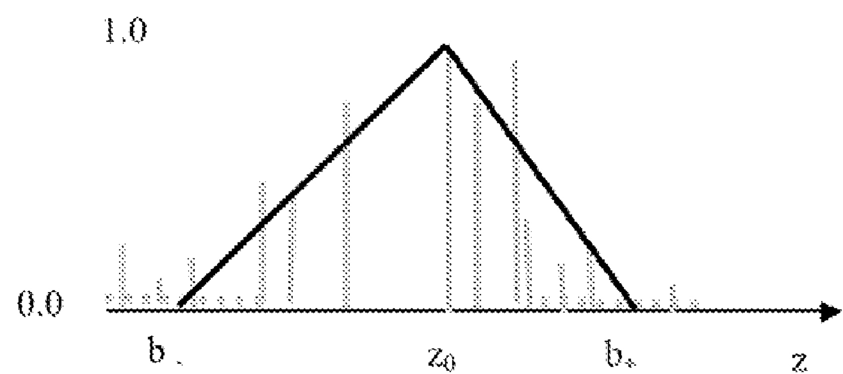
FIG. 5 shows a triangular fuzzy set representing individual membership grades.

The information granule can be expressed as some fuzzy set. In particular, triangular fuzzy sets can be easily formed. As shown in FIG. 5 the modal value of the membership function is $z_0$ FIG. 5 shows triangular fuzzy set representing individual membership grades; the cutoff points $b_-$ and $b_+$ are optimized by running standard linear regression The optimized fuzzy set is spanned over [0, 1] with the slopes of the membership functions optimized individually for the data positioned below and above $z_0$. The standard linear regression applied here returns the parameters $b_-$ and $b_+$ in the membership function.

The result formed by the use of the principle of justifiable granularity—being either an interval or some type of fuzzy set defined over the unit interval—gives rise to type-2 fuzzy sets. In the first case, we form interval-valued fuzzy sets with membership intervals given by $[z_-, z_+]$. In the second case, we end up having triangular fuzzy sets defined in the unit interval.

5. Experiments

The suite of experiments reported here, which consists of synthetic as well as Machine Learning data (http://www.ics.uci.edu/~mlearn/MLSummary.html) is intended to illustrate the performance of the method.

Synthetic Data

We consider a small data set where N=10 and n=3.

| $X_k$ | | | | | $Y_k$ |
|---|---|---|---|---|---|
| 0.7 | 0.9 | 0.1 | 0.4 | 0.2 | 1.0 |
| 0.1 | 0.4 | 0.9 | 0.5 | 0.1 | 0.7 |
| 1.0 | 0.1 | 0.7 | 0.8 | 0.5 | 0.2 |
| 0.6 | 0.8 | 0.7 | 0.2 | 0.6 | 1.0 |
| 0.6 | 0.0 | 0.1 | 0.2 | 0.8 | 0.4 |
| 0.7 | 0.9 | 1.0 | 1.0 | 0.7 | 0.3 |
| 1.0 | 0.2 | 1.0 | 0.1 | 0.8 | 0.6 |
| 1.0 | 0.3 | 0.0 | 0.4 | 1.0 | 0.9 |
| 0.2 | 0.9 | 0.1 | 0.4 | 0.2 | 1.0 |
| 0.0 | 0.5 | 0.8 | 0.9 | 0.9 | 0.5 |

The population size is 20 and the PSO was run for 80 generations. The choice of these particular values has been a result of intensive experimentation; we found that the size of the population was sufficient enough to maintain diversity and explore the search space. Further increase in the population size did not contribute to any improvement in the obtained results; however, it negatively impacted the computing time. The method was run for several values of "c" ranging in-between 2 and 6. The values of the performance index along with the selected subsets F are shown below

| c | Q | # of data |
|---|---|---|
| 2 | 0.298 | 1, 3 |
| 3 | 0.302 | 1, 3, 8 |
| 4 | 0.157 | 1, 3, 4, 6 |
| 5 | 0.157 | 1, 3, 4, 6, 7 |
| 6 | 0.033 | 1, 3, 4, 5, 6, 8 |

It is interesting to note that several data points are the same across all sets F, say data #1, 3, 6, and 8, which points at their stability and sustainable relevance when it comes to the representation of the whole data set.

Figure 6:
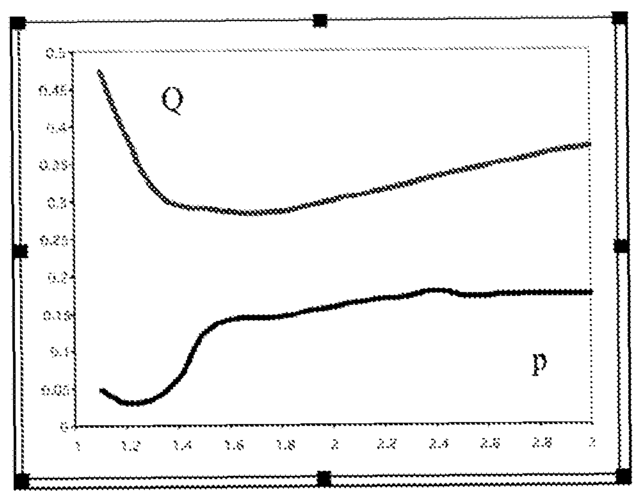
FIG. 6 shows a graph of performance index versus a parameter p.

The proposed approach comes with an important design parameter (p), whose adjustable values could impact the performance of the results. As a matter of fact, this effect is clearly present in the experiments. We experimented with the values of "p" for c=2 and 5, which produced the results shown in FIG. 6, which shows a performance index versus p for c=2 and 5 (upper and lower curve).

The results presented there are quite convincing. The increase in the number of points used for representation leads to the superior performance. There are optimal values of "c" and they depend upon the cardinality of F. When c=2 the optimal value of "p" is equal to 1.7. For a greater number of elements in F (c=5), the optimal value of "p" is lower (p=1.2), which points at the very different nature of the receptive fields, which in this case are quite extended.

Boston Housing

Figure 7:
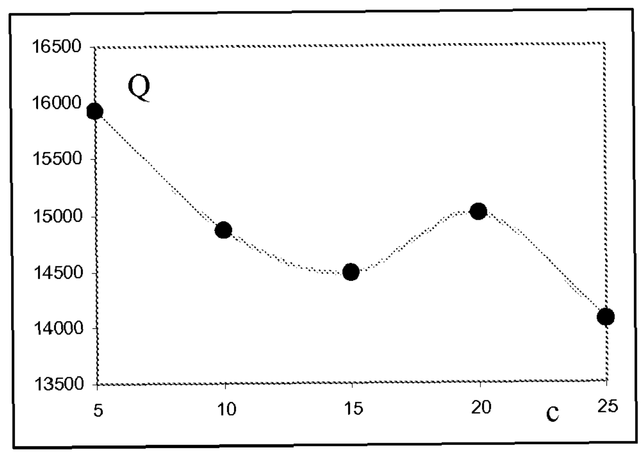
FIG. 7 shows a graph of performance index Q versus c.

Here, we consider the data set coming from the Machine Learning Repository. It consists of 390 13-dimensional data points. A single output is the price of real estate. The parameters of the PSO were set as: size of the population is equal to 100 and the number of generations was set to 150. Again, the choice of these values was experimentally-oriented. To analyze the effect of compactification, the process was run for F with 5, 10, 15, 20, and 25 elements. The parameter "p" was set to 2.0. The obtained results are shown in FIG. 7, which shows performance index Q versus "c". It can be noticed that there is a decreasing trend in the values of Q versus increasing values of "c"; however, there could be some local departures from this trend as observed for c=20. The dynamics of change can also be used to make a choice for the compactification level, by taking into account that the lowest value of "c" is preferred; in this case c=15 could be a sound alternative.

6. Computing with Words

Computing with Words (CW) falls within the realm of this study because for at least problems, which are not NP-hard, one cannot discount available contextual information in the formation of information granules and their algorithmic underpinnings. Moreover, such formation can be deceptive because if a complete characterization is not generated, then results are likely to be invalid (e.g., granularizing the optimality of a solution strictly by the number of computational steps exercised in discovering it).

6.1. Randomization as Endemic to CW

An intelligent software system interacts with the user in two principal ways. First, it requests random knowledge to be supplied where necessary. Second, it asks the user or knowledge engineer to confirm symmetric knowledge, where presented. Note that supplying a selection from a pull-down menu is partially random and partially symmetric in its component tasks. No non-trivial domain can be entirely symmetric or entirely random. If the former is sought, then its randomization would result in a mathematical point. If the latter, then the domain itself would serve as its own fixed point, which means that it would be incompressible. In one case, the domain is devoid of knowledge and in the other there is absolutely no symmetry or analogy to be found. Not only are these two extremes contradictions on reality, but they serve to bound the definition of reality. For example, while symmetry is defined by the existence of heuristics, its necessity is not limited to heuristic programming. Thus, in the extreme, the absence of symmetry would not allow for deductive reasoning. Otherwise, the paradigm for making one deduction would at least be similar to the paradigm for making another deduction—in stark contradiction to the total absence of symmetry.

Clearly, if a knowledge engineer can supply the requested random or symmetric knowledge, then it is through the application of acquired knowledge. It follows that if that knowledge can be captured in a knowledge-based system(s), then the requested tasks can be automated. Furthermore, let our grammar-based system be used as the shell, which acquires the knowledge that the user or knowledge engineer would otherwise be requested. An interesting and inescapable conclusion follows. That is, the only thing not automated would be the acquisition of random knowledge by the auxiliary system(s). In other words, randomness can be defined along a continuum in degrees. What is being claimed is that a network of cooperating grammar-based systems requests knowledge that is random in proportion to the size of its collective randomized knowledge bases.

As more and more knowledge bases are linked in a network, then the knowledge needed becomes more and more random. For example, the following indefinite sequences are observed to occur in increasing order of randomness: 1, 1, 1, 1, 1, 1, 1, 1, 1, 1; 1, 1, 2, 1, 2, 3, 1, 2, 3, 4; 1, 4, 2, 7, 5, 3, 6, 9, 0, 8. That is, the generating function for each successive sequence grows larger and larger until the sequence is a fixed point, or truly random.

Consider the limit. Here, the knowledge bases reach some critical finite radius, where the knowledge embodied can not be bounded (e.g., as in a finite number of rules). At this point, the needed knowledge is truly random. For example, the system may benefit from knowing that coherent light is polarized when reflected off of a magnetized surface, or that when heated to the Fermi point iron loses all magnetic properties, etc. This exemplifies random knowledge. It follows that an example of symmetric knowledge is that coherent light is polarized in the opposite plane when reflected off of a magnetized surface of the opposite polarity.

A consequence of Gödel's Incompleteness Theorem is that countably infinite truths are recursively enumerable, but not recursive. Consider two total computable functions, f, and g. We say that they are total because they are defined over all members of the domain. They are said to be computable because they can be realized by some algorithm. In particular, let that algorithm be substituted for by a sequence of transformation rules, which may be iterated over. Moreover, let A and A' represent a pair of symmetric domains. For example, A could represent an increasing sort and A' could represent a decreasing sort. Let B represent an orthonormal or mutually random domain with respect to A. For example, B could represent an algorithm to invert a matrix. Then, $f(A) \rightarrow A'$ and $g(A) \rightarrow B$. It follows that $|f|<|A'|$ and $|g| \geqq |B|$. These relations follow because the fixed point for the magnitude of the transformational map is the magnitude of the image of transformation itself. That is, one can always replace the rule base, g, with B' such that $B'(A) \rightarrow B$, where $|B'| \sim |B|$. This means that mutually symmetric domains are characterized by rulebases consisting of fewer, shorter, and more reusable rules than are the more random pairs. The larger are the domains in the pairing, the more likely are they to embed symmetric constructs.

The degree of randomization possible is in proportion to the magnitude of the information, where there is no upper bound. Also, the processor time required to randomize such information is unbounded. Such absolute minimal entropy can of course never be achieved for it would violate the Incompleteness Theorem. However, there is nothing to preclude the construction of randomizing systems of any desired level of utility.

6.2. Evolutionary Transformation

Knowledge-based randomization evolved from component randomization. This means that components evolved in two simultaneous and orthogonal directions. First, they continued to evolve as domain-specific components. This is termed, horizontal randomization. Second, some components mutated into transformative software. This is termed, vertical randomization. Transformative software evolved just as enzymes evolved in the course of biological evolution. Such software can indeed be captured by the grammar. However, when active it acts like a rule or knowledge-base segment and applies domain-specific knowledge to further randomize the grammar. This means that context-sensitive transformations of components can be made as optimizations in space and/or time. Poor components may be transformed into better ones (e.g., insertion sort to quicksort in the context of n>21 elements). Transformative components are saved in the single grammar in the form of rules, which are even capable of randomizing each other, just as they randomize their containing grammar. That is, the grammar must randomize components, some of which become active in the form of transformation rules—again in the same grammar. These rules effect transformations on themselves. It follows that the Incompleteness Theorem applies, which implies that a countably infinite number of novel suggestions can be made by the grammar, which while ultimately true cannot be proven. Such a technique has promise from an engineering perspective.

6.3. Transformative Components

Transformational components need to be represented in a context-free grammar in such a manner as to be context sensitive in their use. For example, one software design may require a quicksort component because it involves a large data-set, while another may require an insertion sort because it does not. Clearly, the suggested component can never converge in the absence of context. Furthermore, it is only appropriate to substitute one component for its siblings when that component is provably better. Such is the case when, for example, one component has been run through an optimizing compiler and the other has not. Consider the following abstract grammar with the following production rules:

S→a b c D|d b c D

D→g|h

Where a, b, . . . etc. denote terminals and capitals stand for non terminals. Next, suppose that a random component, e, is used with the prefix a b c. Think of this component as being a sort program for example. The grammar is amended to account for this context as follows.

S→a b c D|d b c D|a b c e

D→g|h

Now, e may be superior to g or h, but unless this is provably so for all aspects, it cannot be substituted for D. First, here is the universal optimization:

S→A|d D

A→a D

D→b c e

Next, here is the existential optimization:

S→a B|d B|a A e

B→A D

A→b c

D→g|h

Actually, each production will need to define a new component. This will eliminate the breaking across boundaries that we see here. The user can 'circle' components with far less effort than is required to program code. Such components, or information granules, then serve as foci for randomization. Without breaking boundaries, the universal optimization is:

S→a b c e|d b c e

Again, without breaking boundaries, the existential optimization is the same as the initial amended grammar. Interaction with the user will serve to further randomize this model. Randomization involves the substitution of existing component definitions into grammar strings. Clearly, this technique involves (heuristic) search because the order of substitutions is critical as was proven by Solomonoff.

6.4. Transformational Grammars

Context-free grammars are inherently capable of randomizing, but only within the confines of a certain logical regimen. To achieve a greater degree of randomization, one must step outside of those confines. It is clear that when one 'steps outside' of these confines, one is dealing with randomizing the representational formalism itself—not merely what is represented in that formalism. An example will serve to clarify the metaphor.

Suppose that you are designing a freon refrigerator (FR). It may be reduced to the following basic components: a compressor (C), a fuse (F), a light (L), a door (D), and of course some insulation (I). An evaporator may be assumed to be part of a compressor for purposes of illustration. Other components are similarly deemed to be extraneous. It may then be written that a FR is defined by:

FR→C, F, L, D, I

The order of the components is presumably that in which they were learned. Next, consider the acquisition of a freon air conditioner (FAC), which may be reduced to the following components: a compressor (C), a fuse (F), a blower (B), and a vent (V). It may then be written that a FAC is defined by:

FAC→C, F, B, V

Next, define a thermoelectric refrigerator (TR). It may be reduced to the following components: an array of thermocouples (T), a fuse (F'), a light (L), a door (D), and again some insulation (I). It may then be written that TR is defined by:

TR→T, F', L, D, I

Here, F' represents a fuse rated for lower amperage than F, since unlike the case with inductive motors, there is no inductive spike of current drawn on connecting the array of thermocouples. Finally, define a thermoelectric air conditioner (TAC). It may be reduced to the following components: an array of thermocouples (T), a fuse (F"), a blower (B), and a vent (V). It may then be written that TAC is defined by:

TAC→T, F", B, V

Next, let us write the grammar where the representation is immutable, or invariant:

FR→C, F, L, D, I
FAC→C, F, B, V
TR→T, F', L, D, I
TAC→T, F", B, V

It can be randomized with the following result.

FR→W, X
FAC→W, Y
TR→T, F', X
TAC→T, F", Y
W→C, F
X→L, D, I
Y→B, V

Here, W represents a component defined by a compressor-fuse assembly, which can be considered to be the same for freon refrigerators or air conditioners. Similarly, X represents a component defined by a light, a door, and insulation, or a frame assembly.

Finally, Y represents a component defined by a blower-vent assembly. The reader will be convinced that this is about the best randomization that can be obtained at this level.

Next, we say that all of the previous components are passive in the sense that they do not transform other components. On the other hand, if a component is capable of transforming other components, it is said to be active. The same component can be passive in one situation and active in another. Active components can also transform each other and even themselves. In fact, two interesting observations can be made at this point. First, DNA-based strands and the enzymes that are spun off of them, which of course are basic to living organisms, have been playing the active/passive component game for years. Indeed, biologists tell us that enzymes can and do transform other enzymes, which then act back on their parents to transform them. Such defines randomization operations at ever-increasing levels of complexity. It also follows that since these enzymes, or active components, are capable of self-reference, that a countably infinite number of properties hold true for the system—all of which are true, but none of which can be proven.

Grammars that consist entirely of passive components allow for the design of relatively inefficient components. This follows because the user may select a locally correct component definition in a pull-down menu, but do so unaware that the resulting global design will be inefficient if that component is used in the local context. The inclusion of active components provides for the capture and reuse of the users expressed knowledge of optimization. Such optimizations can be applied to active components—including, at least in theory, self-referential optimization. Evidently, there need be no attendant inefficiency of scale if the grammar includes active components.

To continue with the above example, define an active component, Z. This component can be reduced to the following components: Q, which substitutes an array of thermocouples (T) for a compressor (C); R, which replaces a fuse (F) with an appropriate one (F' or F") and, S, which replaces a frame assembly (X) by a blower-vent assembly (Y). The active component is thus defined by:

Z→Q, R, S where Q, R, and S are written as non-terminals to suggest that they need not necessarily be primitives. This is in keeping with traditional grammar theory. The commas serve to indicate that the transformation is a macro sequence of steps—not a composition.

Let us next apply this transform to the freon refrigerator, FR. We write FR Z, where FR is said to be the preimage of the transformation in keeping with standard terminology. There is no production having the form, ?→FR Z Thus, a composition is taken at the next level of component definition. That is, FR Z is equivalent to (((FR Q) R) S), which of course is equivalent to ((((C, F, L, D, I) Q) R) S). It follows by definition that the following active component reductions may be taken. Active components act as identity transformations where not otherwise defined.

T→C Q
F→F R
F→F R
Y→X S

It then follows that ((((C, F, L, D, I) Q) R) S)→(((T, F, L, D, I) R) S)→((T, F', L, D, I) S)→((T, F", L, D, I) S)→T, F", B, V. The transformation from F' to F" can be by default or through a menu selection, which represents random programming. Notice now that T, F", B, V→T, F", Y→TAC. Thus, TAC→FR Z. This tells us that a thermoelectric air conditioner can be constructed by applying our Z-transform to the freon refrigerator. If the z-transform sounds familiar it is only because all of mathematics derives from the concept of transformation (e.g., the geometric-transform differs from the z-transform only in the sign of its exponent).

Recall that an expert compiler maps high-level constructs to lower-level ones through the application of domain-specific knowledge. Active components serve in this capacity as more general transformations. They unify the knowledge base and the representational formalism into a homogeneous structure; namely, the grammar.

Notice that the advantage of using this active component is that just like the passive components, it can be reused—in whole or in parts. This makes for a higher degree of randomization. This is the advantage imparted by using a transformative representation. Active components can act on each other and in theory at least on themselves.

Here is the previously passively randomized grammar:

FR→W X
FAC→W Y
TR→T F' X
TAC→T F" Y
W→C F
X→L D I
Y→B V

Next, this result will be actively randomized:

FR→W, X
FAC→W, Y
TR→T, F', X
TAC→T, F", Y
TAC→FR Z
T→C Q
F'→F R
F"→F R

W→C, F
X→L, D, I
Y→B, V
Y→X S
Z→Q, R, S

The image of transformation is cached along with its transformative definition to facilitate retrieval. The cache is fixed in size and follows from Denning's implementation of working sets in operating systems. It is only necessary that the fundamental derivation be saved, since this can always be used to recreate any cached production. Of course, caching the most-frequently used productions—including the active components—is a randomization over the temporal domain, since it saves time. Randomization is a phenomenon of scale. That is, even though the grammar may appear to be larger here, it is destined for a much higher information density. For example, TAC will be suggested if the user specifies T, F", or FR. Further randomizations can be made as follows. The explanation can be read directly from the grammar:

FR→W, X
FAC→W, Y
TR→W', X
TAC→W', Y
TAC→FR Z
T→C Q
F'→F R
F"→F R
W→C, F
W'→T, F'
W'→T, F"
W'→W Z'
X→L, D, I
Y→B, V
Y→X S
Z→Z', S
Z'→Q, R

Notice that Z' is a further reuse of Z. While it is not shown, either of these active components can result from the application of other active components to active and/or passive components. It turns out that spatial randomization is gained at the cost of temporal randomization. This is none other than the familiar space-time tradeoff. The use of active components implies that greater degrees of randomization can be obtained if and only if one is to allow for more time in recreating the passive components when needed—caching aside.

Let us turn to briefly analyze this phenomenon. In the first limit, all the components are passive and there is no retrieval time penalty. In the second limit, all of the components are generated by chance transformations, which while as potentially compact as any truly random number generator, it takes exponential time to synthesize arbitrary passive components. It should be noted that these two limits comprise a random-basis test of the phenomenon. Clearly, randomization is ubiquitous. It must then be the case that the proper space-time tradeoff is defined by the domain to which the system is to be applied. Again, such systems are necessarily domain-specific in keeping with the dictates of the halting problem in computability theory.

The previous grammar shows that if the user states that he or she has an array of thermocouples, then the system attempts to confirm that an array-fuse assembly is desired. If it is, then the system attempts to confirm that the user is designing a thermoelectric refrigerator or a thermoelectric air conditioner. Similarly, if the user states that he or she has a light bulb, then the system attempts to confirm that the user is designing a frame assembly. If so, then the system attempts to confirm that a blower-vent assembly is being designed. Again, this need not be the case. If it is not, then it is like telling the system that you are designing a refrigerator—not an air conditioner.

Most significantly, notice that passive components are granules, but no other recursively enumerable method for granularization is known to achieve the results as presented in this section. Also, while for example such VLSI placement and routing programs as the original MP2D (Multi-Port 2-Dimensional) placement and routing program, they do so without incorporating grammatical or other theoretical techniques. However, there is no theoretical contradiction here. Despite the fact that printouts of MP2D will pile five feet off the ground, the program is mathematically trivial and the more or less random methods it employs are allowed under randomization theory.

7. Refrigeration Design Example

In this section, an example is discussed to demonstrate the utility of randomization in learning to abstract design principles from granularizations of refrigeration systems and apply those principles to assist design engineers. The refrigeration example was chosen here for the sake of clarity; although, it should be clear than many other examples will do as well.

Figure 8:
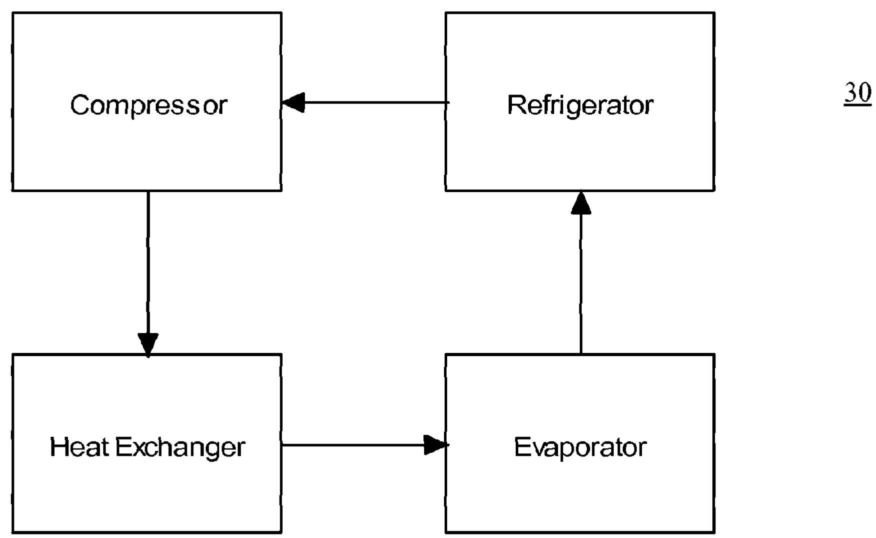
FIG. 8 shows a block diagram of a single-stage Carnot-cycle refrigeration system.

To begin, consider the design of a simple Carnot-cycle refrigeration system 30, see FIG. 8.

This design 30 in FIG. 8 has the simple predicate representation:

| |
|---|
| Next (Compressor, Heat Exchanger) |
| Next (Heat Exchanger, Evaporator) |
| Next (Evaporator, Refrigerator) |
| Next (Refrigerator, Compressor) |

Figure 9:
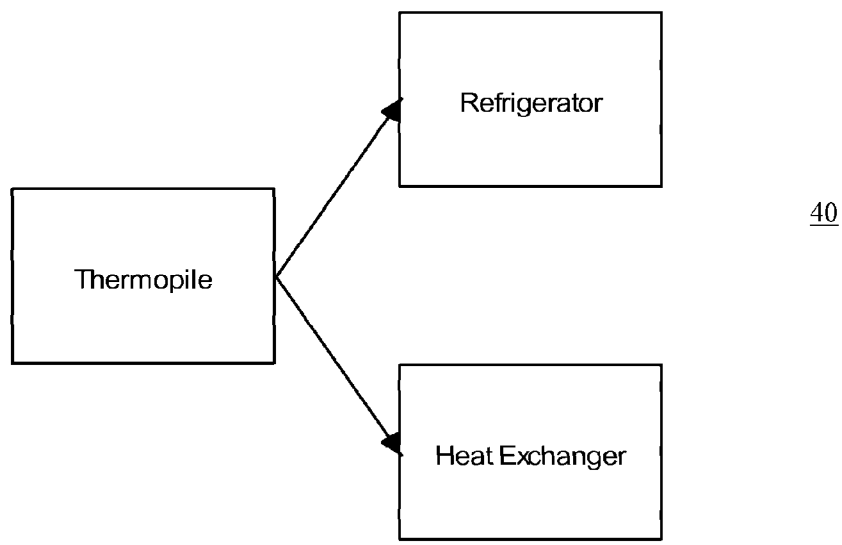
FIG. 9 shows a block diagram of a two-stage Carnot-cycle refrigeration system.

Consider a simple thermoelectric refrigerator (FIG. 9), designed as an improvement upon our simple Carnot-cycle refrigeration system:

This design 40 has the simple predicate representation:

| C |
|---|
| Next (Thermopile, Refrigerator) |
| Next (Thermopile, Heat Exchanger) |

Here, the problem is to create a version space of possible maps from A to C as a prelude to the automatic design of a multi-stage thermoelectric refrigerator. The idea is to automatically port knowledge from one related design to another. The rules in the version space will be automatically constrained by other cases in system memory, which may not be contradicted. In this manner, the system will automatically get smarter with use. At this point, here are two viable maps in the version space, where the second is a generalization of the first:

| A | | C |
|---|---|---|
| Next (Compressor, Heat Exchanger)<br>Next (Heat Exchanger, Evaporator)<br>Next (Evaporator, Refrigerator)<br>Next (Refrigerator, Compressor) | → | Next (Thermopile, Refrigerator)<br>Next (Thermopile, Heat Exchanger) |
| Compressor | → | Thermopile |

-continued

| A | | C |
|---|---|---|
| Evaporator | → | NIL |
| Next (X, NIL) | → | NIL |
| Next (NIL, Y) | → | NIL |
| Equal (Refrigerator, Thermopile) | | (Thermopile, Refrigerator) |

Now, consider applying this generalization to the design of a multi-stage thermoelectric refrigeration system. That is, A→C B':

| A | | C | B' |
|---|---|---|---|
| Next (Compressor, Heat Exchanger) | | Next (Thermopile, Heat Exchanger) | |
| Next (Heat Exchanger, Evaporator) | | | Next (Heat Exchanger, Heat Exchanger) |
| Next (Evaporator, Refrigerator) | → | | NIL |
| Next (Refrigerator, Compressor) | | Next (Refrigerator, Thermopile) | Next (Freezer, Thermopile) Equal (Refrigerator, Freezer) |

Figure 10:
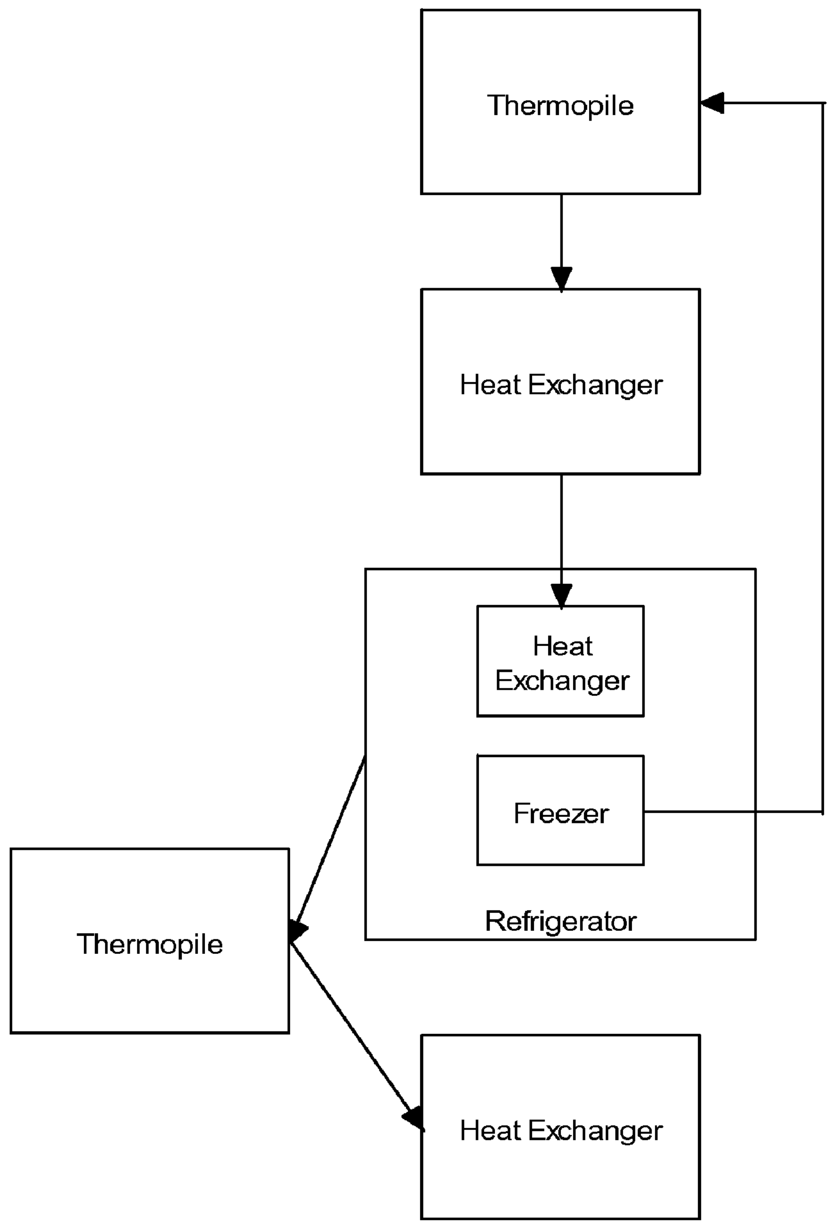
FIG. 10 shows a block diagram of an untransformed two-stage thermoelectric freezer.
Figure 11:
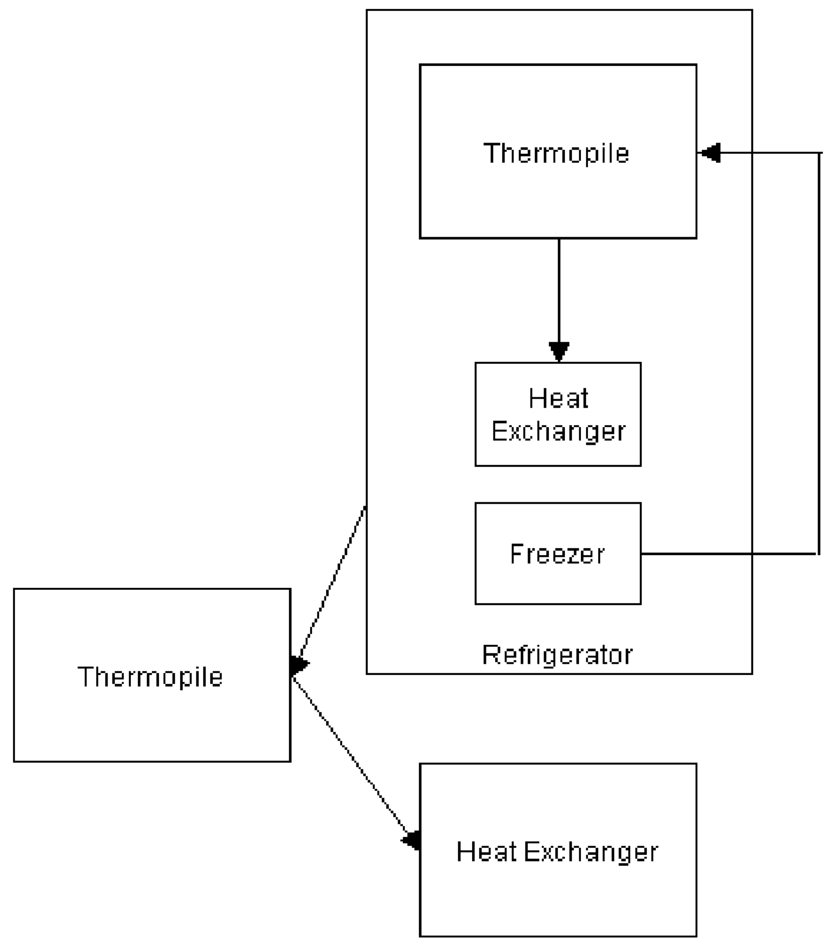
FIG. 11 shows a block diagram of a first transformation result for a two-stage thermoelectric freezer.

The initial equivalent depiction of this two-stage thermoelectric freezer follows, as shown in FIGS. 10 and 11.

This design is not quite correct though due to a random variation. That is, the translation from fluid mechanics to thermoelectrics is not perfectly symmetric. We observe that while it makes sense to cool a compressed gas in stages to conserve energy, this is not practical to do using thermocouples. Thus, we need to add the domain-specific (context-sensitive) transformation rule (discovered automatically by a KASER algorithm):

{Next (Thermopile, Heat Exchanger), Next (Heat Exchanger, Heat Exchanger)}→{Next (Thermopile, Heat Exchanger)}.

The corresponding flowchart follows—refer to the freezer 50 shown in FIG. 10. Notice that this rule captures this essential difference in thermoelectric systems design for broadly applicable reuse (and further specialization). Notice that this rule would not fire for the case of compressors. If we had designed the thermoelectric refrigerator first and now wanted to transform our solution to a gas refrigerator, then we would have the rule:

{Next (Thermopile, Heat Exchanger)}→{Next (Compressor, Heat Exchanger), Next (Heat Exchanger, Evaporator), Next (Evaporator, Refrigerator)}, where {Next (Heat Exchanger, Evaporator)}→{Next (Heat Exchanger, Evaporator), Next (Heat Exchanger, Heat Exchanger)}.

Observe that right recursion will not be a problem. If we look closely at FIG. 10, we find a design flaw; namely, a thermopile and its heat exchanger must be maintained at the same ambient temperature. FIG. 11 evidences that this is not the case for the second-level thermopile 60. Given that the graphics package here may not embody such domain-specific knowledge, we need to add the predicates, namely, Same_Temp (Thermopile, Heat Exchanger), Colder (Refrigerator, Ambient), and possibly Colder (Freezer, Refrigerator). A first or second-order predicate calculus can be employed here to deduce relations. For example, a thermopile may not be found to be at ambient temperature with its heat exchanger in the freezer because we can deduce Colder (Freezer, Ambient), which violates Same_Temp (Thermopile, Heat Exchanger). FIG. 11 shows the working two-stage thermoelectric freezer model 80.

Figure 12:
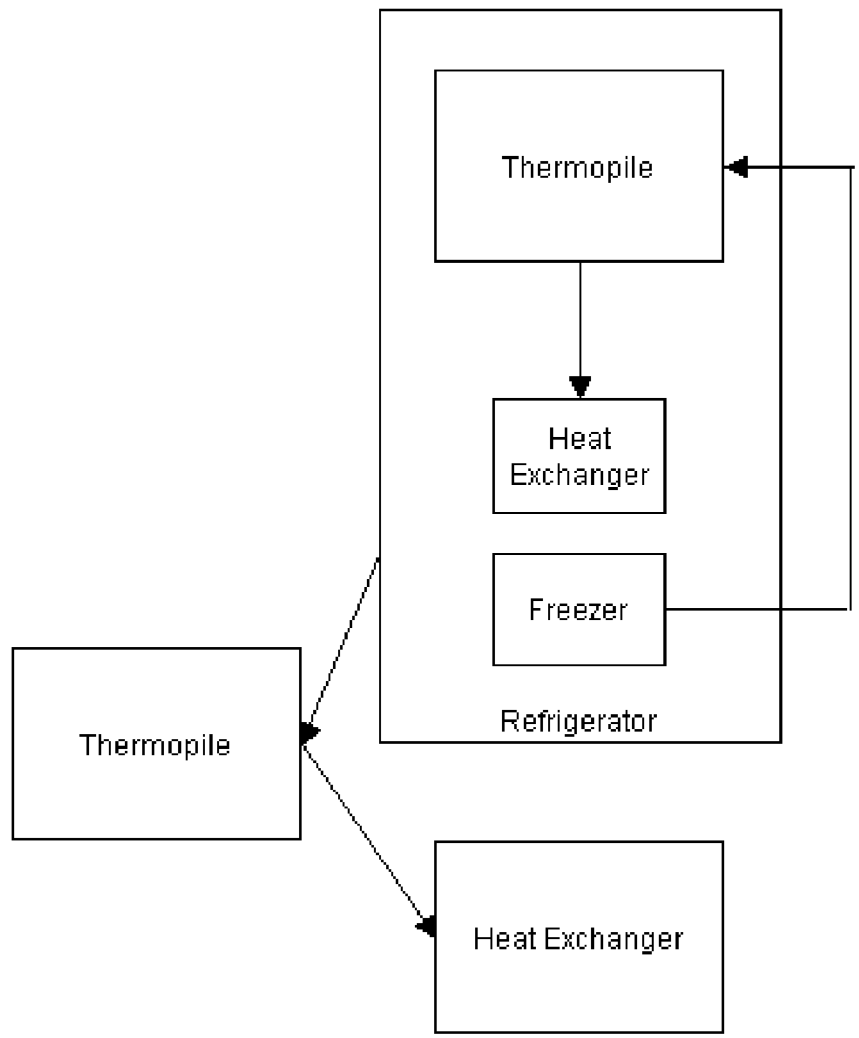
FIG. 12 shows a block diagram of a second transformation result for a two-stage thermoelectric freezer.

FIG. 12 shows the Second Transformation Result for a Two-Stage Thermoelectric Freezer 80. This simple example does not include (or preclude) the use of informative connectives (e.g., a dotted line indicating that the Heat Exchanger and Freezer must not be too close to each other, and the like). Just like the directed arrow translates into the "Next" predicate, the labeled line segment here might be translated into the "Distant" predicate. Furthermore, each non-primitive box is hierarchically defined. Of course, decision boxes and similar constructs (e.g., to capture concurrency as in, Concurrent (Apply Front Brakes, Apply Rear Brakes)) may augment our block diagrams for use in more complex designs. Also, facilities may eventually be needed to support development by simultaneous users. Moreover, so far all generalizations have been made in the first-order predicate calculus through the simulated application of a KASER language translation algorithm. Finally, fuzziness in system design is captured by an allowance for nondeterministic (probabilistic) rewrite rules. For example, the predicate relation, Equal (Refrigerator, Freezer) can induce non-determinism into the design process.

It has been shown how fuzzy sets and grammatical inference play an interdependent role in granularization and knowledge-based characterization for use of the same in polynomial-time problems. At the outset, we show that compactification is possible in a domain-general way using the standard methods of EP (Evolutionary Programming) and swarm optimization. Then, in Section 4, as we move from knowing nothing about the application domain to knowing somewhat more about a non-trivial domain, we see that Type 1 fuzzy logics can be replaced by Type 2 fuzzy logics. The auxiliary knowledge then is captured by the representation of the fuzzy function. However, even this is not as far as we can go. Specifically, CW allows us to represent knowledge qualitatively, which allows for the formation of information granules on the definition of abstract relations using the grammatical formulations of Section 5. Of course, a mixed qualitative/quantitative formulation is permissible though we have teased them apart to facilitate description and analysis.

The intertwined processes of granularization, CW, and Type 2 fuzzy logic all serve to decrease the entropy of a system by way of extracting information granules along some defined metric space (including the cases exploiting tensor analysis). Indeed, to do so was one of Arbib's goals in the creation of denotational programming semantics and possibly Hoare's axiomatic semantics. The reason for the practical failure of these approaches is now clear. They simply do not respect all available contexts in granular formation. Such context may be dynamic, weighted, and of course context sensitive. Representational formalism is the key. While there is no single general representation, this paper has treated grammatical and granular representations of knowledge. Then, by setting the representational formalism itself as a domain, we find that evolution itself requires a pseudo-representational formalism and thus has been treated as well in the paper proper.

From the above description, it is apparent that various techniques may be used for implementing the concepts of the present invention without departing from its scope. For example, features of the invention provide as follows:

Computes with words (i.e., veristic computing) and Type 2 fuzzy sets

Allows for real-time analogical transformations of the design for creative computing Allows for constraint-based computation Allows for granularization of components to create new components Allows for input to be in the form of granularized component cases—greatly reducing the cost of system creation and maintenance Allows for iterative Type 0 expansion of components Iteratively randomizes components for their optimization Unlike neural networks (or evolutionary programming or genetic algorithms, et al.) it can recognize and exploit domain symmetries to again greatly reduce design time and costs Creates new designs open under deduction Performs commonsense reasoning and learns from user interaction The described embodiments are to be considered in all respects as illustrative and not restrictive. It should also be understood that invention is not limited to the particular embodiments described herein, but is capable of many embodiments without departing from the scope of the claims.

What is claimed is:

1. In a computer, a method comprising:

designing a system of systems where the systems include a first designed system defined by passive granulated information components using context-free grammars, the method further comprising the steps of:

randomizing all components to maximize reusability and minimize the incidence of error, including increasing the density of the passive granulated information components;

applying components, as appropriate, such that an image of transformation which defines symmetry can either create a passive component, such as an object, or an active component, which is a component capable of transforming other components, including itself, in a more compact form;

caching the image of transformation along with its transformative definition, including caching at least the fundamental derivation where the active transformation components create symmetric and creative designs; and, where all components are represented in a context-free grammar under direct human control, where the systems include iteratively defined sub-systems, and where the passive components and active components are reused in whole or in part, including using a version space of possible maps from the first system design to a second related system design, the version space having rules, which are automatically constrained by other cases in the first system design memory, which may not be contradicted, and the second system design automatically learns with use and user feedback how to generalize the first system design so as to enable the creation of the version space.

2. The method of claim 1 including automatically porting knowledge from the first system design to the second system design such that the second system design automatically learns with use and user feedback how to generalize the first system design so as to enable the creation of the version space.

3. The method of claim 2 including transforming the second generalization to the design of the second system through the application of active transforms.

4. The method of claim 3 including adding a context-sensitive transformation rule(s) to prevent inappropriate application of the active transform(s).

* * * * *